United States Patent
Abe et al.

(10) Patent No.: US 8,130,716 B2
(45) Date of Patent: Mar. 6, 2012

(54) RADIO BASE STATION AND SCHEDULING METHOD

(75) Inventors: Atsushi Abe, Yokohama (JP); Masanori Taira, Yokohama (JP); Shiro Mazawa, Fujisawa (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 529 days.

(21) Appl. No.: 12/336,655

(22) Filed: Dec. 17, 2008

(65) Prior Publication Data

US 2009/0196241 A1 Aug. 6, 2009

(30) Foreign Application Priority Data

Jan. 31, 2008 (JP) .................... 2008-020626

(51) Int. Cl.
*H04W 72/08* (2009.01)
*H04J 1/16* (2006.01)

(52) U.S. Cl. ........ 370/330; 370/343; 370/232; 370/252; 370/468; 455/452.2

(58) Field of Classification Search .......... 370/328, 370/329, 330, 341, 342–343, 332–333, 232, 370/252, 468, 344–345; 455/452.1, 452.2, 455/450

See application file for complete search history.

(56) References Cited

U.S. PATENT DOCUMENTS

| | | | |
|---|---|---|---|
| 6,944,141 B1* | 9/2005 | Yen | 370/330 |
| 7,193,966 B2* | 3/2007 | Gupta et al. | 370/231 |
| 7,570,620 B2* | 8/2009 | Miyata et al. | 370/334 |
| 7,660,279 B2* | 2/2010 | Brueck et al. | 370/328 |
| 7,813,291 B2* | 10/2010 | Yoon et al. | 370/252 |
| 7,860,056 B2* | 12/2010 | Kwun et al. | 370/329 |
| 2004/0141479 A1* | 7/2004 | Cha et al. | 370/329 |
| 2005/0105492 A1* | 5/2005 | Simonsson et al. | 370/332 |
| 2006/0061258 A1* | 3/2006 | Tagawa et al. | 313/496 |
| 2008/0123615 A1* | 5/2008 | Hoshino et al. | 370/343 |
| 2009/0067329 A1* | 3/2009 | Sumasu et al. | 370/232 |

OTHER PUBLICATIONS

3rd Generation Partnership Project 2 "3GPP2", Oct. 2002.

* cited by examiner

*Primary Examiner* — Kwang B Yao
*Assistant Examiner* — Candal Elpenord
(74) *Attorney, Agent, or Firm* — Mattingly & Malur, PC

(57) ABSTRACT

The present invention is to accommodate a large number of users required in a digital radio communication system and to prevent communication quality from deteriorating. The present invention is to prevent the occurrence of a delay by adding a process for restricting packet assignment for a call having low communication quality. When the average DRC value is equal to or smaller than a threshold, assigned slots are thinned out to improve communication quality for radio terminals close to cell boundaries and to increase the number of radio terminals accommodated. As a method for thinning out assigned slots, packets received from an upper level unit of a radio base station are, for example, discarded before transmission as long as the lowest limit sound quality is maintained. With this operation, the lowest limit sound quality is ensured.

20 Claims, 11 Drawing Sheets

RADIO BASE STATION AND SCHEDULING METHOD

CLAIM OF PRIORITY

The present application claims priority from Japanese patent application JP 2008-020626 filed on Jan. 31, 2008, the content of which is hereby incorporated by reference into this application.

BACKGROUND OF THE INVENTION

1. Field of the Invention

The present invention relates to radio base stations and scheduling methods, and more particularly, to a radio base station and a scheduling method for controlling packet assignment according to the quality of radio communication in a digital radio communication system.

2. Description of the Related Art

An adaptive rate method may be used in a digital radio communication system as a method for changing the communication speed according to the quality of a radio channel in order to increase the efficiency of frequency use. An upstream communication rate, a downstream communication rate, or both are determined according to the quality of the radio channel.

In a system that uses an adaptive rate method where an upstream rate and a downstream rate are determined according to the quality of a channel, such as a 1xEV-DO system, a radio terminal determines the downstream rate according to the quality of a downstream channel measured by the radio terminal.

FIG. 11 shows the relationship between downstream channel quality and determined downstream channel rates in a conventional adaptive rate method.

In general, the lower the channel quality is, the larger the number of slots used per radio packet; and the higher the channel quality is, the smaller the number of slots used. When a hybrid ARQ method is used as a retransmission method for downstream signal data, if packet recovery is found to be possible at an intermediate slot among assigned slots, slot assignment is cancelled at the slot and the remaining slots can be assigned to another user. With the use of this method, flexible channel assignment is possible according to the quality of the downstream channel.

Non-patent Document 1: 9.3.1.3.1 Modulation Parameters (pages 9-67 to 9-70), cdma2000 High Rate Packet Data Air Interface Specification, C.S0024-0, V 4.0, The Third Generation Partnership Project 2 (3GPP2) Specifications, URL: http://www.3gpp2.org/Public_html/specs/tsgc.cfm, searched for on Sep. 11, 2007

SUMMARY OF THE INVENTION

In a digital radio communication system, such as a 1xEV-DO system, a packet delay does not make a large influence on quality in conventional best-effort data communication. In recent years, however, it is demanded that an application that requires real-time processing be used in the radio communication system. In that case, the influence on service quality caused by a delay cannot be ignored. In a real-time application system, for example, in a VoIP system, small-size packets need to be sent with a short delay, and, in addition, a large number of accommodated users need to be handled.

When a user uses a low quality channel, a plurality of slots is assigned to the user at a low communication rate. As a result, the number of users who can be accommodated is lowered and a delay occurs for the other users.

Accordingly, an object of the present invention is to accommodate a large number of users required in a digital radio communication system and to prevent communication quality from deteriorating.

Another object of the present invention is to prevent the occurrence of a delay by adding a process for restricting packet assignment for a call having low communication quality.

To solve the above-described drawbacks, for example, when a radio base station in a 1xEV-DO system determines that a downstream channel is congested at a certain level or more by determining, for example, that the slot use rate is equal to or more than a threshold, if the radio base station determines, among users who use an identical application, for example, among VoIP users, a user who uses relatively many slots at the same throughput because of a relatively low quality of the downstream channel by determining that the average data rate control (DRC) value becomes equal to or smaller than a threshold, an assigned slot is thinned out in the present invention. If thinning out occurs in a burst, the sound cannot be recovered by interpolation. Therefore, it is necessary to take some measure so as not to thin out assigned slots in a burst. In addition, it is possible to use either a constant thinning-out rate or a thinning-out rate changed according to the degree of congestion in the downstream channel. With this, the lowest limit sound quality is guaranteed. It is expected that the thinning-out rate is switched between the two rates described above, for example, for radio terminal users located close to cell boundaries, in many cases.

The present invention provides a radio communication system having radio terminals and a radio base station that employs adaptive rate control that changes the communication rates according to the quality of radio channels. The radio base station includes a communication-rate selection section, a section for determining the number of use slots assigned according to the selected communication rate and for thinning out an assigned slot, and a section for assigning the thinned-out slot to another radio terminal. The radio communication system ensures that a predetermined number of radio terminals are accommodated and solves congestion for other radio terminals.

In the present invention, as the section for thinning out an assigned slot, there is a section for controlling slot assignment such that thinning out does not prevent data recovery with interpolation.

In the present invention, as a section for selecting a radio terminal to which slot assignment control is applied, the following three sections may be used: a section for measuring the quality of a radio channel between the radio base station and a radio terminal, a section for selecting a communication rate according to the result of measurement, and a section for performing channel assignment based on the quality of a radio channel by determining the number of use slots assigned according to the selected communication rate and for selecting a radio terminal to which a large number of use slots are assigned because of the low quality radio channel.

As the section for thinning out an assigned slot, the section for performing slot assignment control, or a section for controlling slot assignment to a radio terminal to which a large number of use slots are assigned, a section for setting a thinning out rate in slot assignment to a constant value irrespective of the degree of congestion of the radio channel may be used.

As the section for thinning out an assigned slot, the section for performing slot assignment control, or the section for controlling slot assignment to a radio terminal to which a large number of use slots are assigned, a section for changing the thinning out rate in slot assignment according to the degree of congestion of the radio channel may be used.

According to the first solving means of the present invention, there is provided a radio base station for a radio communication system that employs adaptive rate control where a communication rate is changed according to the quality of a radio channel, the radio base station comprising:

a radio receiver for receiving an upstream signal that includes request rate information, from a radio terminal;

a radio base station controller
for comparing the request rate information included in the upstream signal received by the radio receiver, with a threshold determined in advance,
when the request rate information is equal to or larger than the threshold, for determining that the quality of a radio channel with the radio terminal is relatively high, and for performing scheduling such that packet data is to be sent with a short slot, which means a slot length used is short or the number of slots used is small, and
when the request rate information is equal to or smaller than, the threshold, for determining that the quality of the radio channel with the radio terminal is relatively low, and for determining whether, if a part of packet data to be sent is discarded prior to the transmission, the part can be recovered by complement, and for performing scheduling, when the part can be recovered, such that the part is discarded and a corresponding slot is assigned to another packet data to be sent to another radio terminal; and a radio transmitter for transmitting the packet data to the radio terminal or the other packet data to the other radio terminal according to the scheduling performed by the radio base station controller.

According to the second solving means of the present invention, there is provided a scheduling method in a radio base station for a radio communication system that employs adaptive rate control where a communication rate is changed according to the quality of a radio channel, the radio base station comprising the steps of:

receiving an upstream signal that includes request rate information, from a radio terminal;

comparing the request rate information included in the upstream signal with a threshold determined in advance;

when the request rate information is equal to or larger than, or larger than the threshold, determining that the quality of a radio channel with the radio terminal is relatively high, and for performing scheduling such that packet data is to be sent with a short slot, which means a slot length used is short or the number of slots used is small, and transmitting the packet data to the radio terminal; and when the request rate information is smaller than, or equal to or smaller than, the threshold, determining that the quality of the radio channel with the radio terminal is relatively low, and for determining whether, if a part of packet data to be sent is discarded prior to the transmission, the part can be recovered by complement, and for performing scheduling, when the part can be recovered, such that the part is discarded and a corresponding slot is assigned to another packet data to be sent to another radio terminal, and transmitting the other packet data to the other radio terminal.

According to the present invention, when an application that requires real-time processing, such as a VoIP application, is applied to a radio communication system that uses adaptive rate control, even if a user uses a low quality channel, the number of users that can be accommodated is prevented from being lowered, a packet delay is avoided for other users, and the user is prevented from being subjected to the deterioration of communication quality.

DESCRIPTION OF THE PREFERRED EMBODIMENTS

Figure 1:
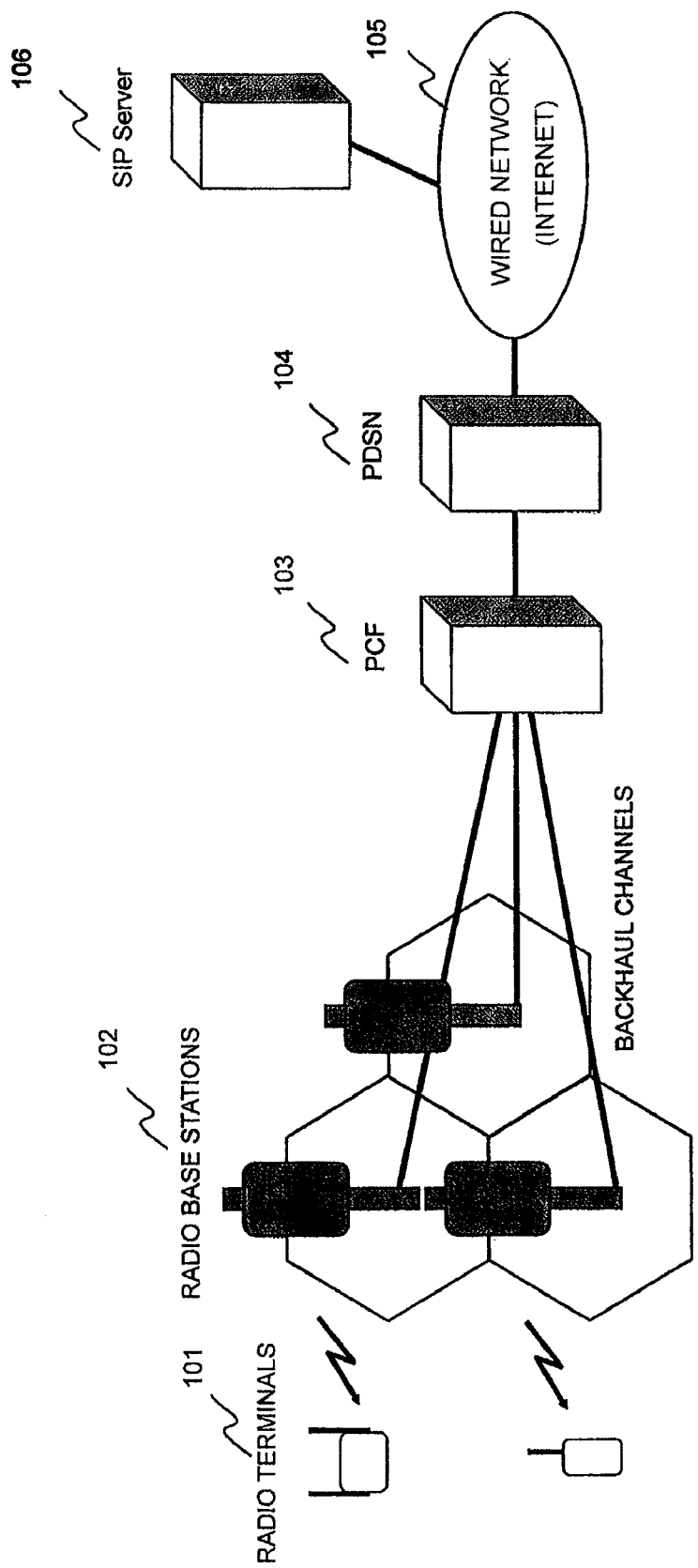
FIG. 1 shows an example structure of a network using 1xEV-DO.

FIG. 1 shows the structure of a VoIP network that uses 1xEV-DO, as an example structure of a mobile communication network.

This network mainly includes radio terminals 101, radio base stations 102, a packet control function (PCF) 103, a packet data serving node (PDSN) 104, a wired network 105 such as the Internet, and a Session Initiation Protocol server (SIP server) 106.

Figure 2:
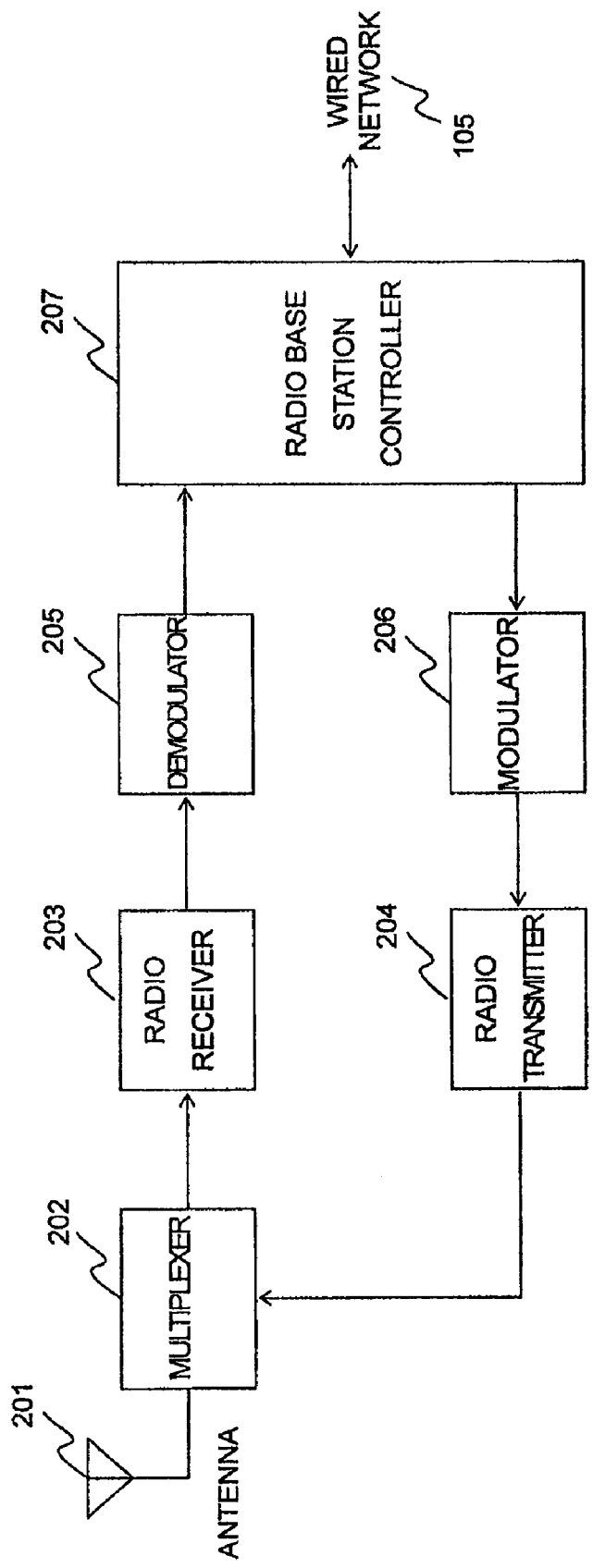
FIG. 2 shows an example structure of a radio base station.

FIG. 2 shows an example structure of the radio base stations 102.

Each radio base station 102 mainly includes an antenna 201, a multiplexer 202, a radio receiver 203, a radio transmitter 204, a demodulator 205, a modulator 206, and a radio base station controller 207.

The antenna 201 sends and receives signals to and from radio terminals 101. The multiplexer 202 is used to share one antenna between a signal to the radio receiver 203 and a signal from the radio transmitter 204. The radio receiver 203 receives an upstream channel signal from a radio terminal 101. The radio transmitter 204 sends a downstream channel radio signal to a radio terminal 101. The demodulator 205 demodulates the received upstream channel signal. The modulator 206 modulates the downstream channel signal to be transmitted. The radio base station controller 207 controls the radio receiver 203, the radio transmitter 204, the demodulator 205, and the modulator 206, controls packet assignment for downstream channel signals, and serves as an interface with the wired network 105.

Figure 3:
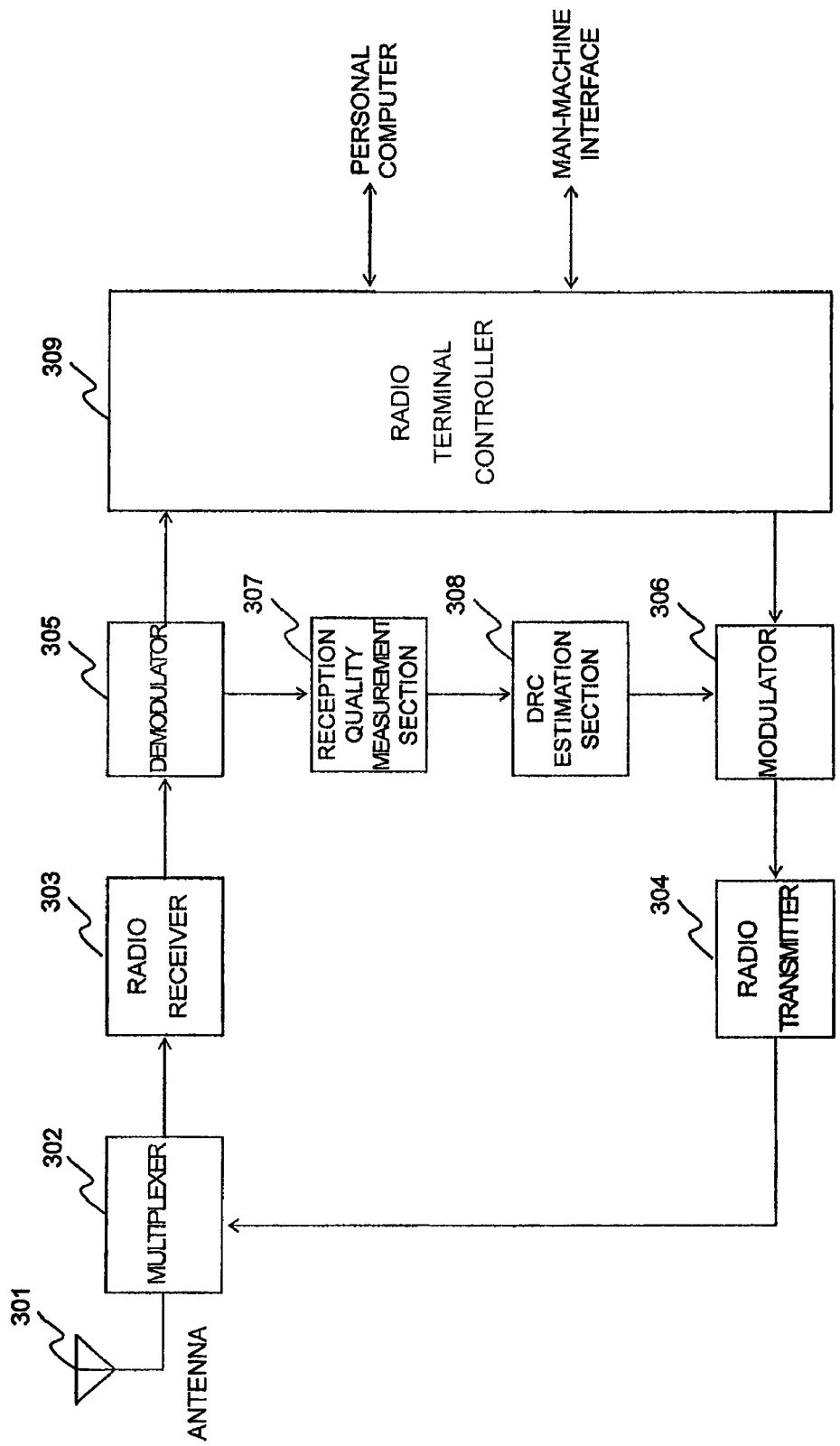
FIG. 3 shows an example structure of a radio terminal.

FIG. 3 shows an example structure of the radio terminals 101. Each radio terminal 101 mainly includes an antenna 301, a multiplexer 302, a radio receiver 303, a radio transmitter 304, a demodulator 305, a modulator 306, a reception quality measurement section 307, a DRC estimation section 308, and a radio terminal controller 309.

The antenna 301 sends and receives a signal to and from a radio base station 102. The multiplexer 302 is used to share one antenna between a signal to the radio receiver 303 and a signal from the radio transmitter 304. The radio receiver 303 receives a downstream channel signal from the radio base station 102. The radio transmitter 304 sends an upstream channel radio signal to the radio base station 102. The demodulator 305 demodulates the received downstream channel signal. The modulator 306 modulates the upstream channel signal to be transmitted. The reception quality measurement section 307 calculates the average and variance of I/Q, which indicate the orthogonal coordinates of the symbol obtained by despreading the demodulated received signal, to obtain the signal to interference ratio (SIR), which indicates signal quality. The DRC estimation section 308 calculates a data rate control (DRC) value, which indicates the rate to be required of the radio base station, based on the SIR. The smaller the DRC value is, the lower the communication rate. The larger the DRC value is, the higher the communication rate. In other words, the radio terminal 101 sets the DRC value larger when the calculated SIR is larger, and sets the DRC value smaller when the calculated SIR is smaller. The radio terminal controller 309 controls the radio receiver 303, the radio transmitter 304, the demodulator 305, the modulator 306, the reception quality measurement section 307, and the DRC estimation section 308, and serves as an interface with a personal computer when the radio terminal 101 is a data communication card or as a man-machine interface, such as a key or a microphone, when the radio terminal 101 is a mobile phone.

Figure 4:
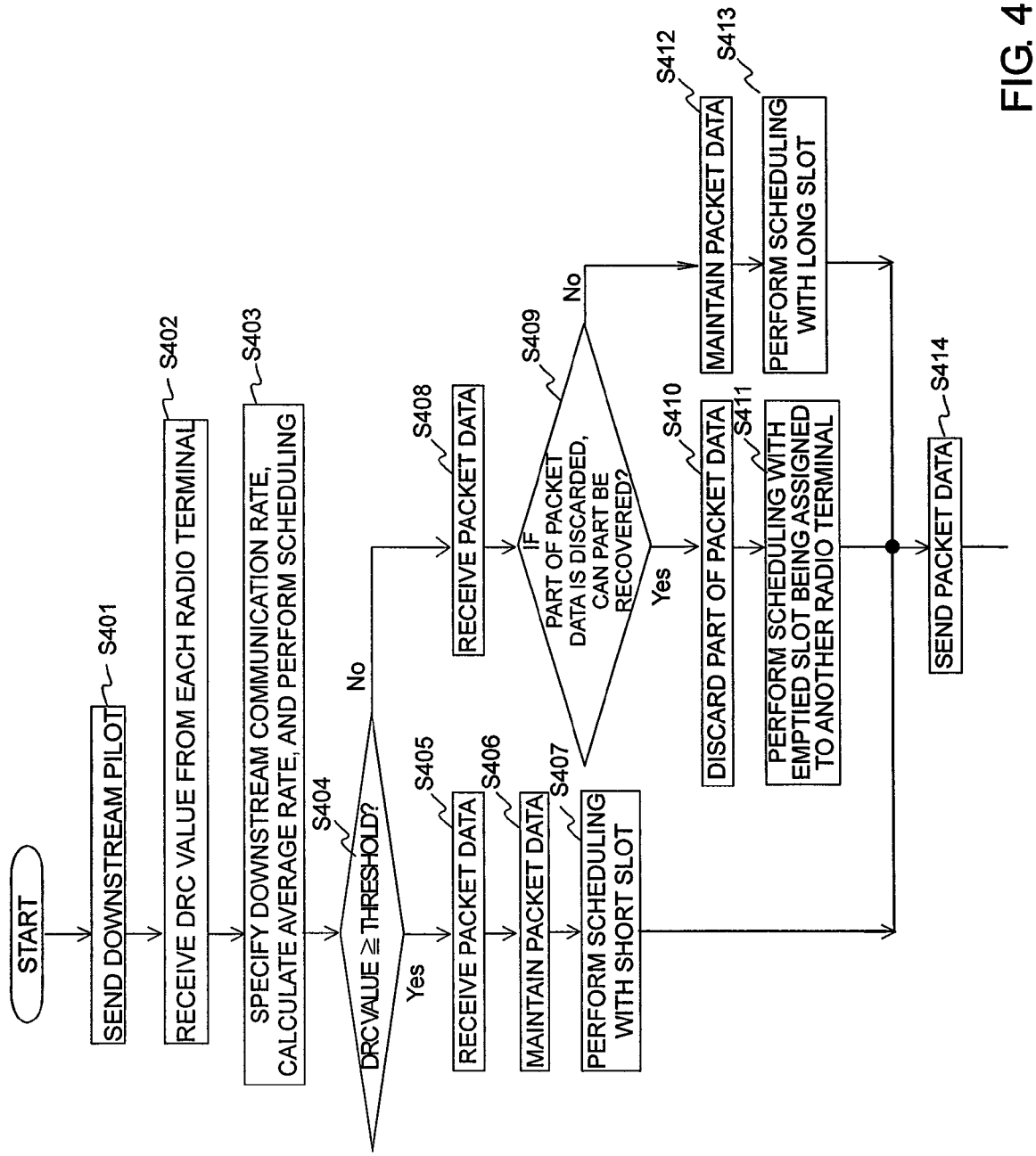
FIG. 4 is an operation flowchart of a radio base station controller.

FIG. 4 is a flowchart of the operation of the radio base station controller 207.

The operation of the radio base station controller 207 will be described below with reference to the block diagrams shown in FIG. 1 and FIG. 2 and the flowchart shown in FIG. 4.

When processing starts after a call connection is established between the radio base station 102 and each radio terminal 101, the radio base station controller 207 of the radio base station 102 sends a downstream signal that includes a downstream pilot signal to the radio terminal 101 through the modulator 206, the radio transmitter 204, the multiplexer 202, and the antenna 201 (S401).

The radio terminal 101 receives the downstream signal and inputs it into the radio terminal controller 309 and the reception quality measurement section 307 through the antenna 301, the multiplexer 302, the radio receiver 303, and the demodulator 305. The reception quality measurement section 307 measures the signal quality of the downstream pilot signal included in the downstream signal, and the DRC estimation section 308 selects a DRC value to be required of the radio base station 102 based on the measurement result. Instead of the DRC value, information indicating an appropriate rate required by the radio terminal 101 may be used. The radio terminal controller 309 sends an upstream signal that includes the DRC value to the radio base station 102 through the modulator 306, the radio transmitter 304, the multiplexer 302, and the antenna 301.

The radio base station 102 receives the upstream signal through the antenna 201, the multiplexer 202, the radio receiver 203, and the demodulator 205, and inputs it into the radio base station controller 207 to receive the DRC value from the radio terminal (S402). The radio base station controller 207 determines a downstream communication rate according to the DCR value reported in the upstream signal from the radio terminal 101. For example, the radio base station controller 207 can determine the downstream communication rate by calculation with an appropriate equation or by a table or threshold determined in advance such that the smaller the DRC value is, the smaller the communication rate; and the larger the DRC value is, the higher the communication rate. In addition, the radio base station controller 207 determines the downstream communication rate for each of all the radio terminals 101 connected to the radio base station 102, calculates the average communication rate R of each radio terminal 101, and also calculates the value (DRC/R) obtained by dividing the DRC of each radio terminal 101 by R (S403). An example expression 1 for calculating R will be shown below.

$$R(t+1) = \left(1 - \frac{1}{t_c}\right)R(t) + \frac{1}{t_c} + DRC(t) \qquad (\text{式}1)$$

where, DRC(t) indicates the data rate required by the user i at time t, R(t) indicates the average of the data rates required by the users i at time t, and $t_c$ indicates 1000 slots, which equals 1.6 seconds.

The radio base station controller 207 performs scheduling for the radio terminals 101 in descending order of DRC/R (S403). This scheduling method is called a proportional fairness method. An appropriate other scheduling method may be used.

Figure 11:
FIG. 11 shows the relationship between downstream channel quality and determined downstream channel rates in a 1xEV-DO system.

As shown in FIG. 11, the lower the downstream channel quality is, the larger the number of slots used or the longer the slot length used; and the higher the downstream channel quality is, the smaller the number of slots used or the shorter the slot length used. The radio base station controller 207 next determines whether the DRC value is equal to or larger than a threshold determined in advance (S404). When the DRC value is equal to or larger than the threshold, which means that the downstream channel quality is high, the result of the determination in step S404 is Yes. In this case, when packet data to be sent to this radio terminal 101 reaches the radio base station 102 through the wired network 105 (S405), the packet data is maintained (S406), scheduling is performed with a short slot (S407), which means that the slot length used is short or the number of slots used is small, and the packet data is sent to the radio terminal 101 (S414).

In contrast, if the downstream channel quality is low, the number of slots used for the radio terminal 101 is larger than that for a radio terminal 101 having high channel quality. When a large number of users are accommodated, congestion may occur for the other users. As a result, it is expected that the number of users accommodated is reduced and delays occur for the other users. In a VoIP system, for example, a delay directly lowers the audio quality. Therefore, when the DRC value is smaller than the threshold, which means low downstream channel quality, the determination of the radio base station controller 207 in step S404 is No. In that case, when packet data to be sent to this radio terminal 101 reaches the radio base station 102 through the wired network 105 (S408), the radio base station controller 207 determines whether, if a part of the packet data is discarded before transmission, that part can be recovered by complement (S409).

For example, a predetermined number of packets that can be discarded is specified within a range where the deterioration of audio quality is permissible. The radio base station controller 207 counts the number of packets discarded and compares the number with the predetermined number in step S409. When the number of packets discarded is equal to or smaller than the predetermined number, the radio base station controller 207 determines that the sound can be recovered. If the number of packets discarded exceeds the predetermined number, the radio base station controller 207 determines that the sound cannot be recovered.

When the sound can be recovered, the radio base station controller 207 discards the part of the packet data (S410), performs scheduling such that the corresponding slot is assigned to another radio terminal (S411), and sends the packet data to the radio terminal 101 (S414). In contrast, if it is determined in step S409 that the sound cannot be recovered, the radio base station controller 207 maintains the packet data (S412), performs scheduling with a long slot (S413), which means that the slot length used is long or the number of slots used is large, and sends the packet data to the radio terminal 101 (S414). With this operation, a predetermined number of accommodated radio terminals used by VoIP users is ensured and packet delays of the other users are avoided.

An example concrete operation in the present embodiment will be described below with a figure.

Figure 5:
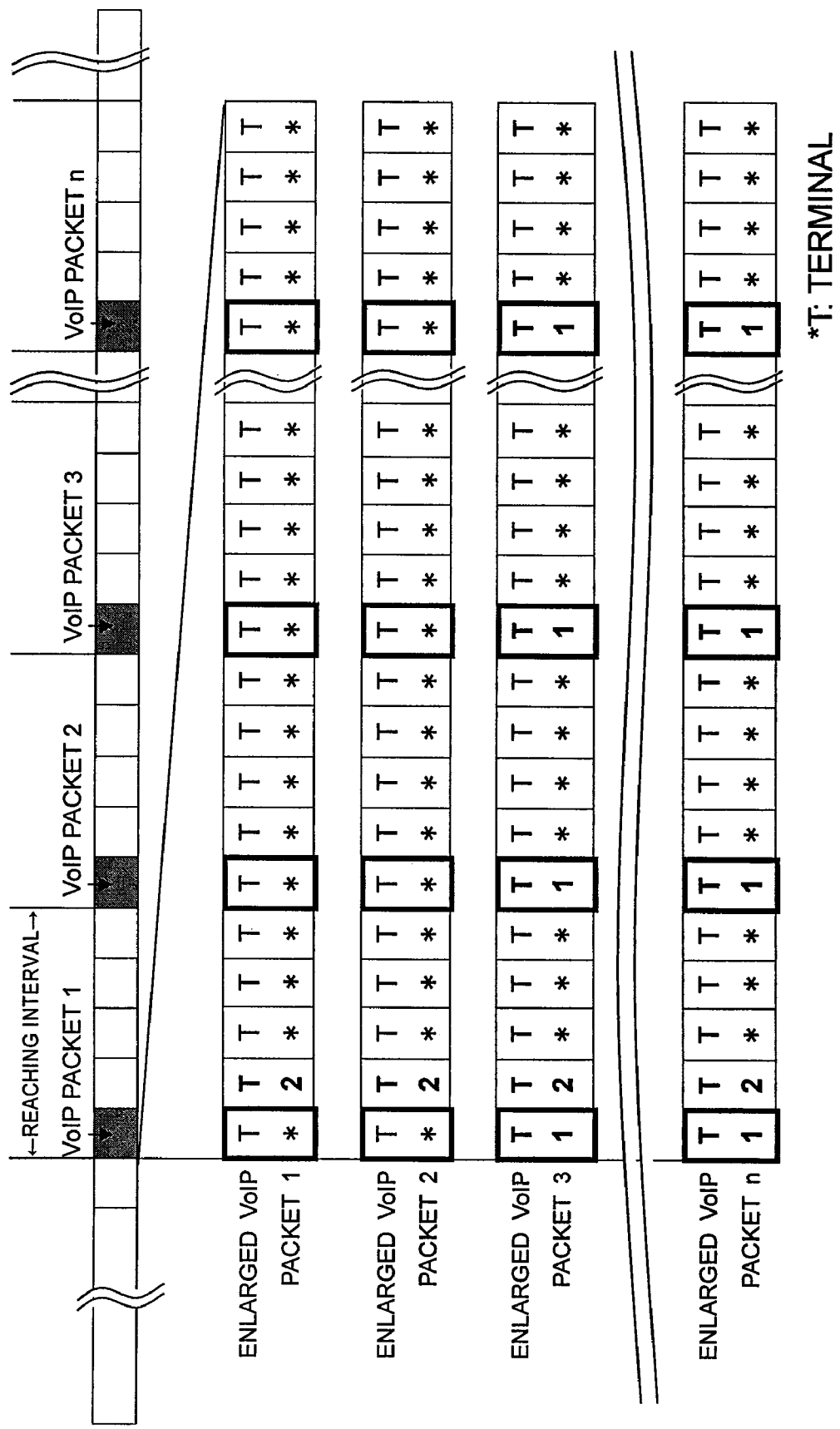
FIG. 5 shows a packet control example (1).

FIG. 5 shows a packet control example (1). In the figure, a first row shows that a VoIP packet group 1, a VoIP packet group 2, . . . , and a VoIP packet group n each having a predetermined number of packets are sent at predetermined reaching intervals. Second and subsequent rows show a plurality of slots included in first packets of each VoIP packet in an enlarged viewing manner.

When a radio terminal 2 has high channel quality, one slot is assigned to each VoIP packet because a VoIP packet is sent by one slot. However, because a radio terminal 1 has low channel quality, it uses many slots, causing congestion for other users when a large number of users are accommodated. In VoIP, packets are discarded in a range where the audio quality appears to be not deteriorated (in a permissible range). For example, packets are discarded up to a predetermined number of (for example, two) packets among n packets, and the number of (for example, three) packets exceeding the predetermined number are not discarded. When packets are discarded, the emptied slots are assigned to other users to solve congestion for them.

Figure 6:
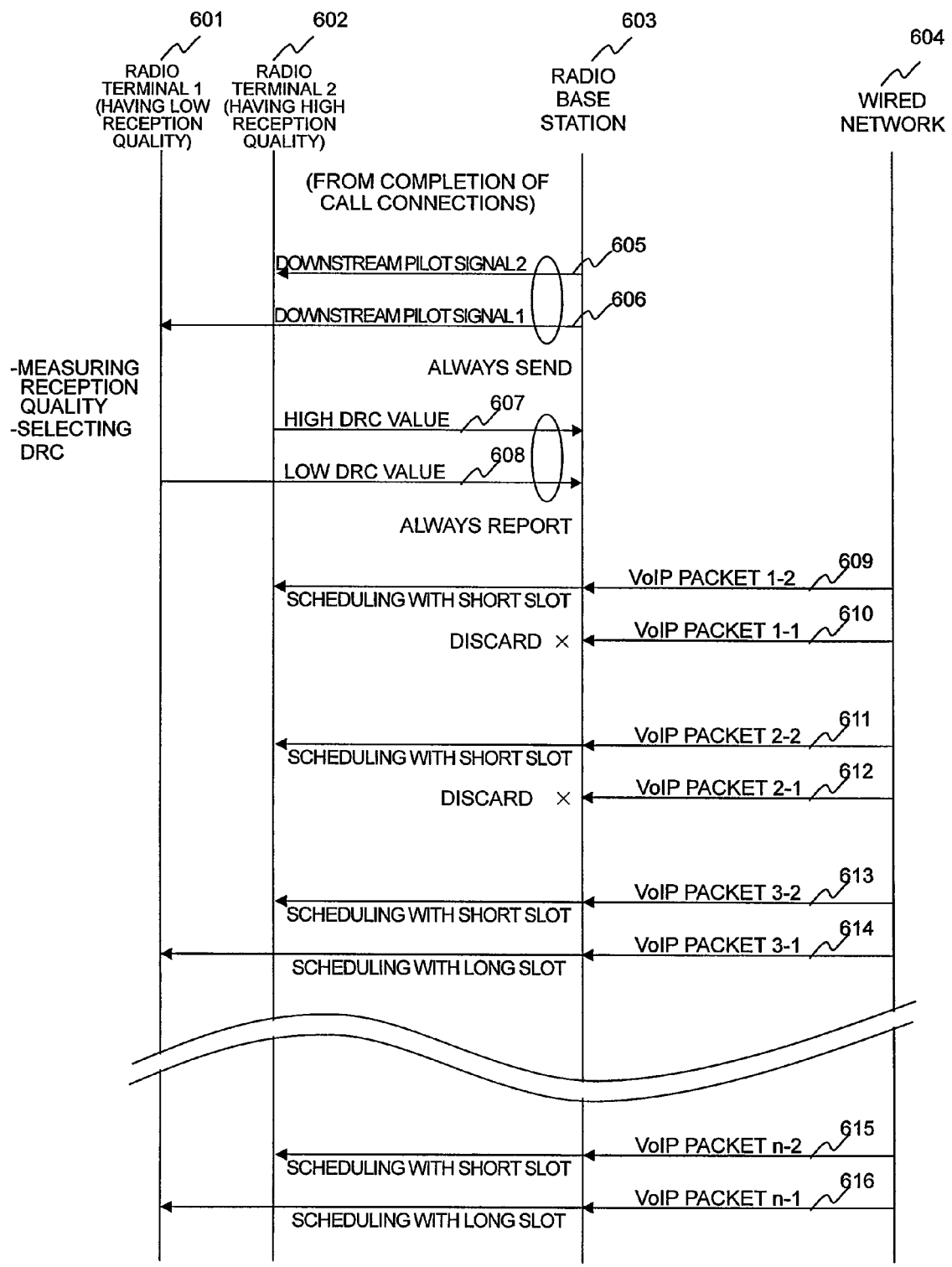
FIG. 6 is a call-connection sequence diagram in the packet control example (1).

FIG. 6 is a sequence diagram of the above-described series operation. Call connections are completed between a radio base station 603 and the radio terminal 1 (601), having low reception quality, and the radio terminal 2 (602), having high reception quality, and VoIP packets reach the radio base station 603 through a wired network 604. This case is taken as an example and will be described below.

The radio base station 603 sends a downstream pilot signal 1 (606) to the radio terminal 1 (601) and a downstream pilot signal 2 (605) to the radio terminal 2 (602). The radio terminal 1 (601), having low reception quality, selects a low DRC value 608 and sends it to the radio base station 603 because a poor result is obtained when the reception quality of the downstream pilot signal 1 (606) is measured. In contrast, the radio terminal 2 (602), having high reception quality, selects a high DRC value (607) and sends it to the radio base station 603 because a good result is obtained when the reception quality of the downstream pilot signal 2 (605) is measured. This control is always executed during the call connections. In the figure, each radio station sends the DRC value to the radio base station 603 only once, but actually the radio base station always receives a DCR value from each radio terminal at predetermined timing.

Since data can be sent at a high rate with less slots to a terminal having high reception quality, the radio base station 603 controls scheduling such that a VoIP packet 1-2 (609) is sent with a short slot and sends the packet to the radio terminal 2 (602), which requests the high DRC value (607). Since a terminal having low reception quality uses many slots at a low rate to cause congestion for other users, the radio base station 603 discards a VoIP packet 1-1 (610) and transmits no packet. When the next VoIP packet 2-1 (612) and the next VoIP packet 2-2 (611) reach the radio base station 603, if the reception quality of the radio terminal 1 (601) and the radio terminal 2 (602) has not changed, the same processes as for the preceding packets are performed. The radio base station 603 controls scheduling such that the VoIP packet 2-2 (611) is sent with a short slot and sends the packet to the radio terminal 2 (602). The radio base station 603 discards the VoIP packet 2-1 (612) and transmits no packet. Then, when the next VoIP packet 3-1 (614) and the next VoIP packet 3-2 (613) reach the radio base station 603, if the reception quality of the radio terminal 1 (601) and the radio terminal 2 (602) has not changed, a different process from that for the preceding packet 2-1 is performed. The radio base station 603 controls scheduling such that the VoIP packet 3-2 (613) is sent with a short slot and sends the packet to the radio terminal 2 (602). Because the number of (for example, three) VoIP packets exceeding a threshold are not allowed to be discarded for the radio terminal 1 (601), the radio base station 603 controls scheduling such that the VoIP packet 3-1 (614) is sent with a long slot and sends the packet to the radio terminal 1 (601). The same processes as for the VoIP packet 3-1 (614) and the VoIP packet 3-2 (613) are performed until a VoIP packet n−1 (616) and a VoIP packet n−2 (615) reach the radio base station 603.

Figure 7:
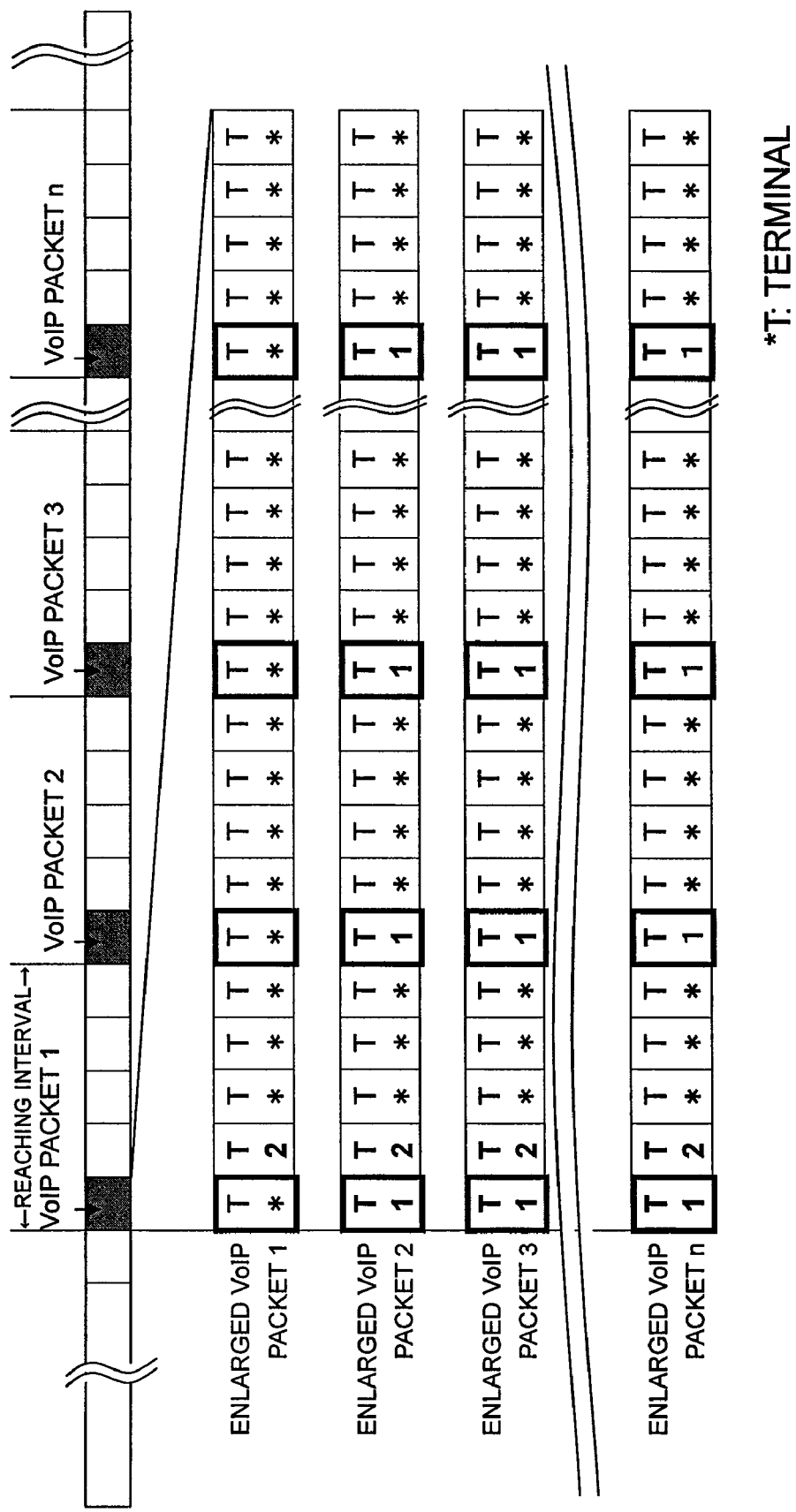
FIG. 7 shows a packet control example (2).

FIG. 7 shows a packet control example (2). When a radio terminal 2 has high channel quality, one slot is assigned to each VoIP packet because a VoIP packet is sent by one slot. However, because a radio terminal 1 has low channel quality, it uses many slots, causing congestion for other users when a large number of users are accommodated. In VoIP, packets are discarded in a range where the audio quality appears to be not deteriorated. Packets are discarded up to a predetermined number of (for example, one) packets among n packets, and the number of (for example, two) packets exceeding the predetermined number are not discarded. When packets are discarded, the emptied slots are assigned to other users to solve congestion for them.

Figure 8:
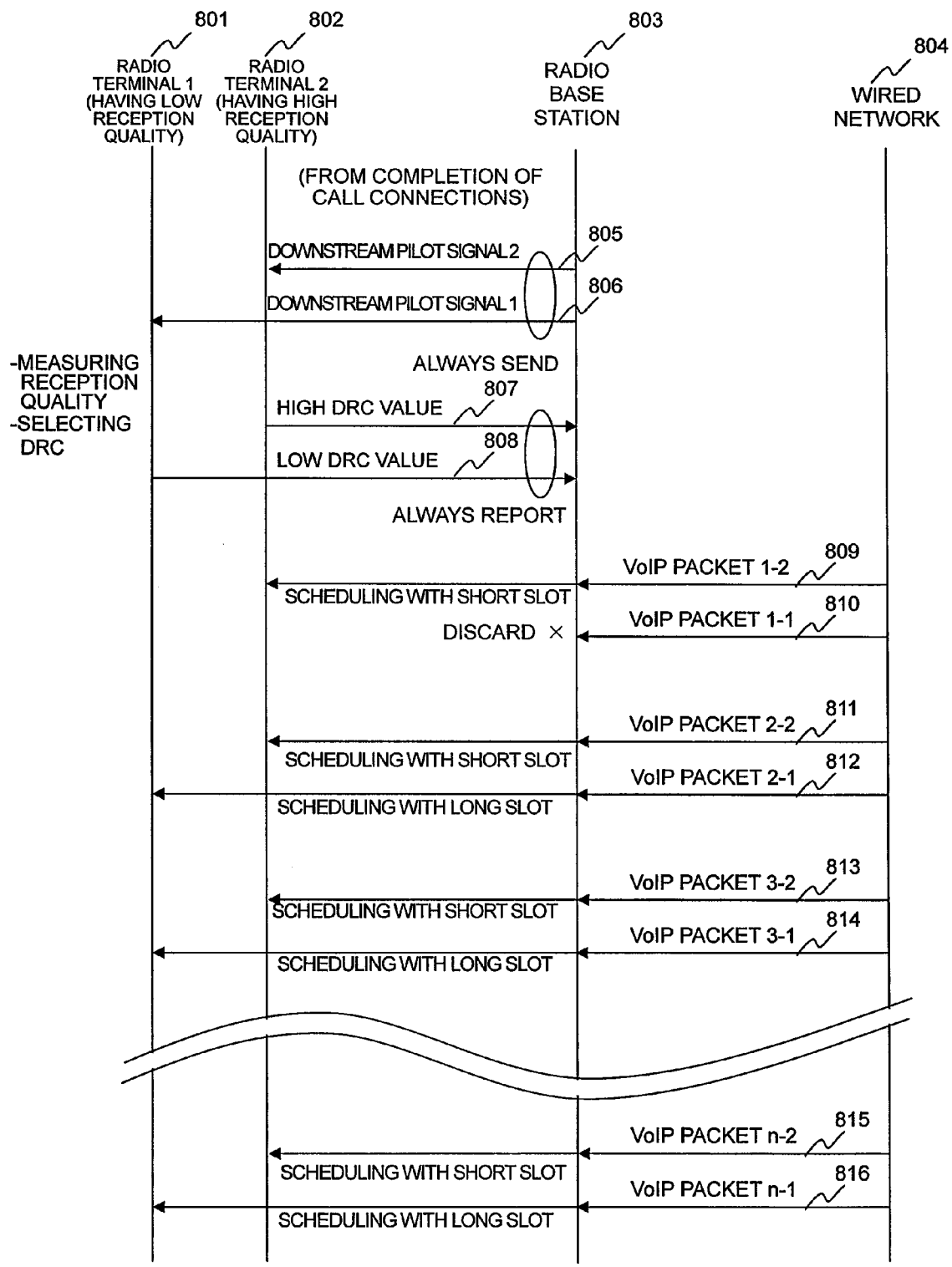
FIG. 8 is a call-connection sequence diagram in the packet control example (2).

FIG. 8 is a sequence diagram of the above-described series operation. Call connections are completed between a radio base station 803 and the radio terminal 1 (801), having low reception quality, and the radio terminal 2 (802), having high reception quality, and VoIP packets reach the radio base station 803 through a wired network 804. This case is taken as an example and will be described below.

The radio base station 803 sends a downstream pilot signal (806) to the radio station 1 (801) and a downstream pilot signal 2 (805) to the radio station 2 (802). The radio terminal 1 (801), having low reception quality, selects a low DRC value 808 and sends it to the radio base station 803 because a poor result is obtained when the reception quality of the downstream pilot signal 1 (806) is measured. In contrast, the radio terminal 2 (802), having high reception quality, selects a high DRC value (807) and sends it to the radio base station 803 because a good result is obtained when the reception quality of the downstream pilot signal 2 (805) is measured. This control is always executed during the call connections.

Since data can be sent at a high rate with less slots to a terminal having high reception quality, the radio base station 803 controls scheduling such that a VoIP packet 1-2 (809) is sent with a short slot and sends the packet to the radio terminal 2 (802), which requests the high DRC value (807). Since a terminal having low reception quality uses many slots at a low rate to cause congestion for other users, the radio base station 803 discards a VoIP packet 1-1 (810) and transmits no packet. When the next VoIP packet 2-1 (812) and the next VoIP packet 2-2 (811) reach the radio base station 803, if the reception quality of the radio terminal 1 (801) and the radio terminal 2 (802) has not changed, different processes than for the preceding packets are performed. The radio base station 803 controls scheduling such that the VoIP packet 2-2 (811) is sent with a short slot and sends the packet to the radio terminal 2 (802). Because the number of (for example, two) VoIP packets exceeding a threshold are not allowed to be discarded for the radio terminal 1 (801), the radio base station 803 controls scheduling such that the VoIP packet 2-1 (812) is sent with a long slot and sends the packet to the radio terminal 1 (801). The same processes as for the VoIP packet 2-1 (812) and the VoIP packet 2-2 (811) are performed until a VoIP packet n−1 (816) and a VoIP packet n−2 (815) reach the radio base station 803.

Figure 9:
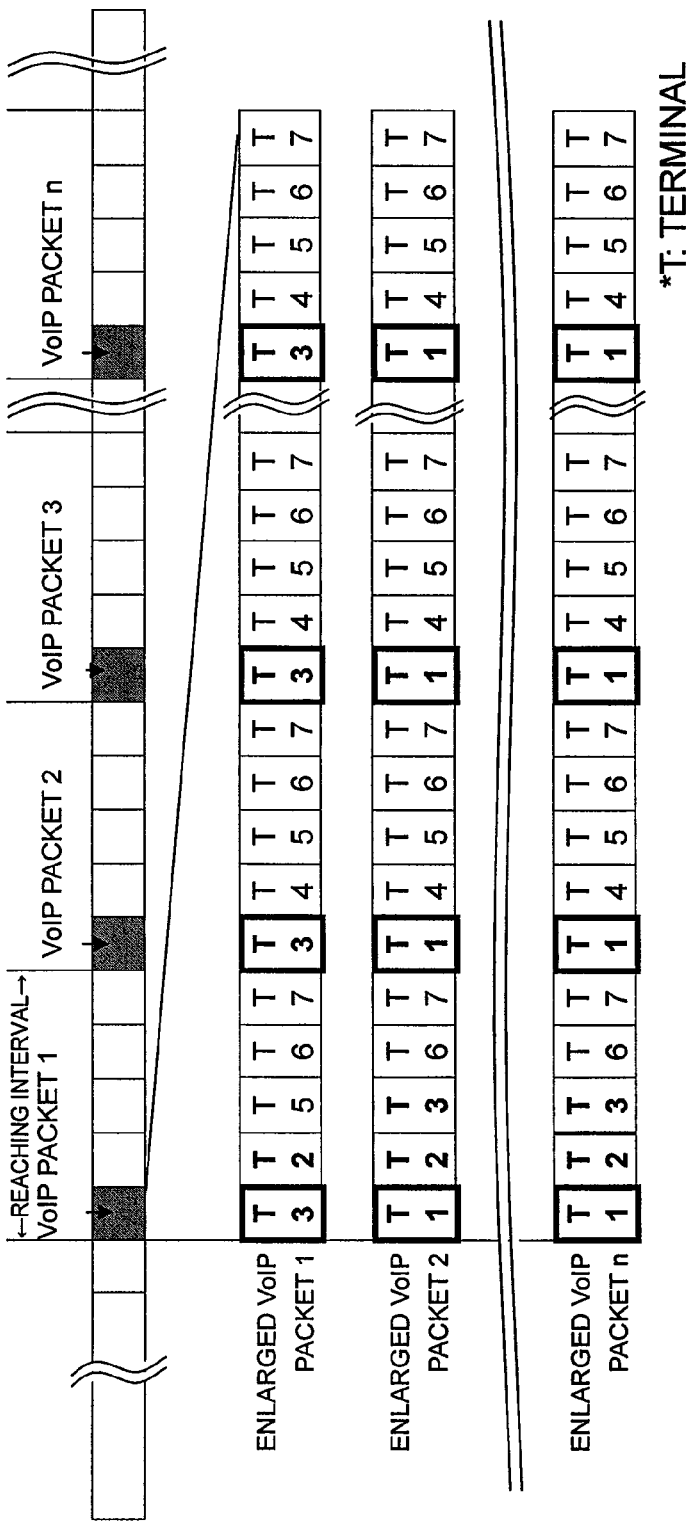
FIG. 9 shows a packet control example (3).
Figure 10:
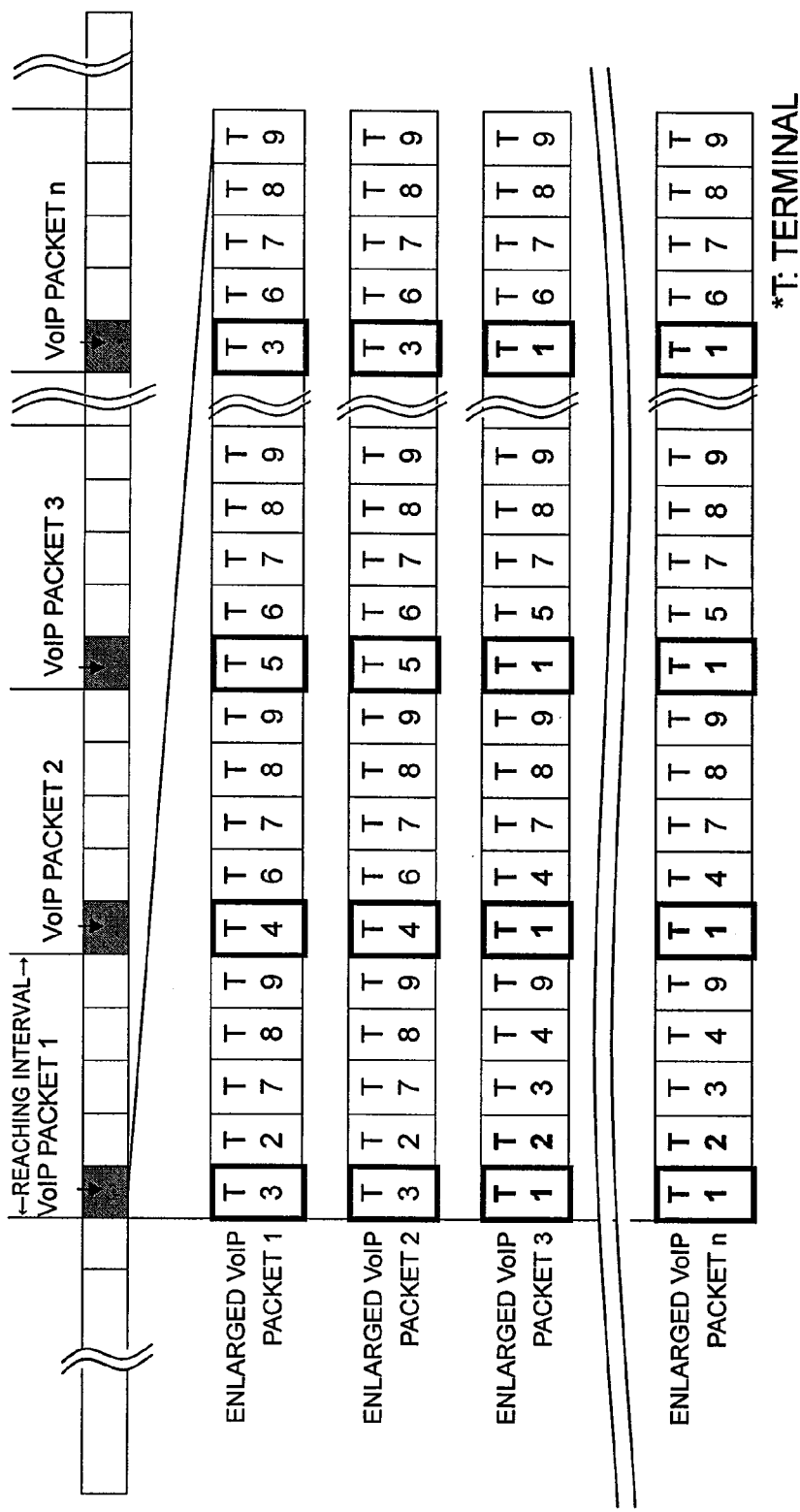
FIG. 10 also shows the packet control example (3).

FIG. 9 and FIG. 10 show a packet control example (3). For example, the state of congestion in a downstream channel is determined by the slot use rate, and the number of packets discarded is increased depending on the state of congestion. The radio base station controller 207 can determine the state of congestion by comparing appropriate data, such as the number of packets used, the slot use rate, the number of slots used, or traffic, with a threshold determined in advance.

As shown in FIG. 9, for example, when it is determined from a low slot use rate that the downstream channel has low congestion, a radio terminal 2 which has high channel quality assigns one slot to each VoIP packet because a VoIP packet is sent by one slot. However, because a radio terminal 1 has low channel quality, it uses many slots, causing congestion for other users when a large number of users are accommodated. In VoIP, packets are discarded in a range where the audio quality appears to be not deteriorated. Packets are discarded up to the first predetermined number of (for example, one) packets among n packets, and the number of (for example, two) packets exceeding the first predetermined number are not discarded. When one packet is discarded, the emptied slots are assigned to other users to solve congestion for them.

As shown in FIG. 10, for example, when it is determined from a high slot use rate that the downstream channel has high congestion, a radio terminal 2 which has high channel quality assigns one slot to each VoIP packet because a VoIP packet is sent by one slot. However, because a radio terminal 1 has low channel quality, it uses many slots, causing congestion for other users when a large number of users are accommodated. In VoIP, packets are discarded in a range where the audio quality appears to be not deteriorated. Packets are discarded up to the second predetermined number of (for example, two) packets among n packets, and the number of (for example, three) packets exceeding the second predetermined number are not discarded. A predetermined number of (for example, two) packets are discarded and the corresponding slots are assigned to radio terminals 3, 4, and 5. Since a larger number of emptied slots are assigned to other users, congestion is solved for the other users.

The present invention can be applied, for example, to a radio communication system that provides a service application, such as VoIP or moving-image distribution, where streaming data is used and a short delay is required.

What is claimed is:

1. A radio base station for a radio communication system that employs adaptive rate control where a communication rate is changed according to the quality of a radio channel, the radio base station comprising: a radio receiver for receiving an upstream signal that includes request rate information, from a radio terminal; a radio base station controller for comparing the request rate information, included in the upstream signal received by the radio receiver, with a threshold determined in advance, when the request rate information is equal to or larger than the threshold, for determining that the quality of a radio channel with the radio terminal is relatively high, and for performing scheduling such that packet data is to be sent with a short slot, which means a slot length used is short or the number of slots used is small, and when the request rate information is smaller than, the threshold, for determining that the quality of the radio channel with the radio terminal is relatively low, and for determining whether, if a part of packet data to be sent is discarded prior to the transmission, the part will be recovered and for performing scheduling, when the part will be recovered such that the part is discarded and a corresponding slot is assigned to another packet data to be sent to another radio terminal; and a radio transmitter for transmitting the packet data to the radio terminal or the another packet data to the another radio terminal according to the scheduling performed by the radio base station controller.

2. A radio base station according to claim 1, wherein the radio base station controller sets a thinning-out rate in slot assignment to a constant value determined in advance irrespective of the degree of congestion of the radio channel and determines whether the part will be recovered.

3. A radio base station according to claim 1, wherein the radio base station controller changes a thinning-out rate in slot assignment according to a value determined in advance in response to the degree of congestion of the radio channel and determines whether the part will be recovered.

4. A radio base station according to claim 1, wherein, if the radio base station controller determines that the part will not be recovered, the radio base station controller performs scheduling such that the packet data is to be sent with a long slot, which means a slot length used is long or the number of slots used is large, and sends the packet data to the radio terminal.

5. A radio base station according to claim 1, wherein the radio base station controller determines a downstream communication rate according to the request rate information included in the upstream signal sent from each of all radio terminals connected to the radio base station, calculates an average rate of the downstream communication rates and divides the request rate information of each of all the radio terminals by the average rate to obtain a quotient, and performs scheduling for all the radio terminals in descending order of the quotient.

6. A radio base station according to claim 2, wherein, if the radio base station controller determines that the part will not be recovered, the radio base station controller performs scheduling such that the packet data is to be sent with a long slot, which means a slot length used is long or the number of slots used is large, and sends the packet data to the radio terminal.

7. A radio base station according to claim 3, wherein, if the radio base station controller determines that the part will not be recovered, the radio base station controller performs scheduling such that the packet data is to be sent with a long slot, which means a slot length used is long or the number of slots used is large, and sends the packet data to the radio terminal.

8. A radio base station according to claim 2, wherein the radio base station controller determines a downstream communication rate according to request rate information included in an upstream signal sent from each of all radio terminals connected to the radio base station, calculates an average rate of the downstream communication rates and divides the request rate information of each of the radio terminals by the average rate to obtain a quotient, and performs scheduling for all the radio terminals in descending order of the quotient.

9. A radio base station according to claim 3, wherein the radio base station controller determines a downstream communication rate according to request rate information included in an upstream signal sent from each of all radio terminals connected to the radio base station, calculates an average rate of the downstream communication rates and divides the request rate information of each of all the radio terminals by the average rate to obtain a quotient, and performs scheduling for all the radio terminals in descending order of the quotient.

10. A radio base station according to claim 4, wherein the radio base station controller determines a downstream communication rate according to request rate information included in an upstream signal sent from each of all radio terminals connected to the radio base station, calculates an average rate of the downstream communication rates and divides the request rate information of each of all the radio terminals by the average rate to obtain a quotient, and performs scheduling for all the radio terminals in descending order of the quotient.

11. A scheduling method in a radio base station for a radio communication system that employs adaptive rate control where a communication rate is changed according to the quality of a radio channel, the radio base station comprising the steps of: receiving an upstream signal that includes request rate information, from a radio terminal; comparing the request rate information included in the upstream signal with a threshold determined in advance; when the request rate information is equal to or larger than the threshold, determining that the quality of a radio channel with the radio terminal is relatively high, and for performing scheduling such that packet data is to be sent with a short slot, which means a slot length used is short or the number of slots used is small, and transmitting the packet data to the radio terminal; and when the request rate information is smaller than the threshold, determining that the quality of the radio channel with the radio terminal is relatively low, and for determining whether, if a part of packet data to be sent is discarded prior to the transmission, the part will be recovered and for performing scheduling, when the part will be recovered, such that the part is discarded and a corresponding slot is assigned to another packet data to be sent to another radio terminal, and transmitting the other packet data to the other radio terminal.

12. A scheduling method in a radio base station according to claim 11, comprising the steps of setting a thinning-out rate in slot assignment to a constant value determined in advance irrespective of the degree of congestion of the radio channel and determines whether the part will be recovered.

13. A scheduling method in a radio base station according to claim 11, comprising the steps of changing a thinning-out rate in slot assignment according to a value determined in advance in response to the degree of congestion of the radio channel and determines whether the part will be recovered.

14. A scheduling method in a radio base station according to claim 11, comprising the steps of, if it is determined that the part will not be recovered, performing scheduling such that the packet data is to be sent with a long slot, which means a slot length used is long or the number of slots used is large, and sending the packet data to the radio terminal.

15. A scheduling method in a radio base station according to claim 11, comprising the steps of: determining a downstream communication rate according to request rate information included in an upstream signal sent from each of all radio terminals connected to the radio base station, calculating an average rate of the downstream communication rates and divides the request rate information of each of all the radio terminals by the average rate to obtain a quotient, and performing scheduling for all the radio terminals in descending order of the quotient.

16. A scheduling method in a radio base station according to claim 12, comprising the steps of, if it is determined that the part will not be recovered, performing scheduling such that the packet data is to be sent with a long slot, which means a slot length used is long or the number of slots used is large, and sending the packet data to the radio terminal.

17. A scheduling method in a radio base station according to claim 13, comprising the steps of, if it is determined that the part will not be recovered, performing scheduling such that the packet data is to be sent with a long slot, which means a slot length used is long or the number of slots used is large, and sending the packet data to the radio terminal.

18. A scheduling method in a radio base station according to claim 12, comprising the steps of: determining a downstream communication rate according to request rate information included in an upstream signal sent from each of all radio terminals connected to the radio base station, calculating an average rate of the downstream communication rates and divides the request rate information of each of all the radio terminals by the average rate to obtain a quotient, and performing scheduling for all the radio terminals in descending order of the quotient.

19. A scheduling method in a radio base station according to claim 13, comprising the steps of: determining a downstream communication rate according to request rate information included in an upstream signal sent from each of all radio terminals connected to the radio base station, calculating an average rate of the downstream communication rates and divides the request rate information of each of all the radio terminals by the average rate to obtain a quotient, and performing scheduling for all the radio terminals in descending order of the quotient.

20. A scheduling method in a radio base station according to claim 14, comprising the steps of: determining a downstream communication rate according to request rate information included in an upstream signal sent from each of all radio terminals connected to the radio base station, calculating an average rate of the downstream communication rates and divides the request rate information of each of all the radio terminals by the average rate to obtain a quotient, and performing scheduling for all the radio terminals in descending order of the quotient.

* * * * *